(12) United States Patent
Schäfer et al.

(10) Patent No.: US 9,825,504 B2
(45) Date of Patent: Nov. 21, 2017

(54) ENERGY STORAGE MODULE COMPRISING A DC LINK

(71) Applicant: ENRICHMENT TECHNOLOGY COMPANY LTD. ZWEIGNIEDERLASSUNG DEUTSCHLAND, Jülich (DE)

(72) Inventors: Christoph Schäfer, Aachen (DE); Rainer Vor Dem Esche, Heinsberg (DE); Arne Spangenberg, Jülich (DE)

(73) Assignee: ENRICHMENT TECHNOLOGY COMPANY, LTD., Zweigniederlassung, Deutschland (DE)

( * ) Notice: Subject to any disclaimer, the term of this patent is extended or adjusted under 35 U.S.C. 154(b) by 135 days.

(21) Appl. No.: 14/896,109

(22) PCT Filed: Jun. 20, 2014

(86) PCT No.: PCT/EP2014/063044
§ 371 (c)(1),
(2) Date: Dec. 4, 2015

(87) PCT Pub. No.: WO2014/206889
PCT Pub. Date: Dec. 31, 2014

(65) Prior Publication Data
US 2016/0118859 A1    Apr. 28, 2016

(30) Foreign Application Priority Data
Jun. 24, 2013   (EP) ..................................... 13173356

(51) Int. Cl.
*H02J 9/00*        (2006.01)
*H02J 1/00*        (2006.01)
(Continued)

(52) U.S. Cl.
CPC ................ *H02K 7/025* (2013.01); *H02J 1/10* (2013.01); *H02J 9/066* (2013.01); *H02J 11/00* (2013.01);
(Continued)

(58) Field of Classification Search
CPC .... H02J 11/00; H02J 1/10; H02J 9/066; H02J 15/00; H02J 9/061; H02K 7/025; H02P 9/48
See application file for complete search history.

(56) References Cited

U.S. PATENT DOCUMENTS 6,288,456 B1 * 9/2001 Cratty ..................... H02J 3/005
                                                            307/64
6,304,006 B1 * 10/2001 Jungreis ................... H02J 3/38
                                                            307/64
(Continued)

FOREIGN PATENT DOCUMENTS

DE         44 21 914 A1    1/1996
DE   10 2006 033562 B3    2/2008

OTHER PUBLICATIONS

International Search Report for Application No. PCT/EP2014/063044 dated Sep. 5, 2014.
(Continued)

*Primary Examiner* — Kenneth B Wells
(74) *Attorney, Agent, or Firm* — Tarolli, Sundheim, Covell & Tummino LLP

(57) ABSTRACT

An energy storage module for the reversible storage of electric energy is provided that comprises several flywheel energy storage units that are electrically connected in parallel via a shared DC link. A first regulation system is connected to the DC link and that, during normal operation (NO), connects the DC link to one or more external power networks in order to absorb (En) energy from or release (Ep) energy into the external power network(s). A second regu-
(Continued)

lation system includes an input side and an output side, whereby the input side is connected to at least the DC link while the output side is connected to an internal supply network for purposes of supplying one or more electrically powered operating aggregates that are needed to operate the flywheel energy storage units.

15 Claims, 5 Drawing Sheets

(51) Int. Cl.
*H02K 7/02* (2006.01)
*H02J 15/00* (2006.01)
*H02J 1/10* (2006.01)
*H02J 11/00* (2006.01)
*H02P 9/48* (2006.01)
*H02J 9/06* (2006.01)

(52) U.S. Cl.
CPC ............... *H02J 15/00* (2013.01); *H02P 9/48* (2013.01); *H02J 9/061* (2013.01); *Y02P 90/50* (2015.11)

(56) References Cited

U.S. PATENT DOCUMENTS

| | | | | |
|---|---|---|---|---|
| 6,559,559 | B2* | 5/2003 | Cratty | H02J 1/06 307/64 |
| 6,611,068 | B2* | 8/2003 | Cratty | H02J 3/005 307/64 |
| 6,849,967 | B2* | 2/2005 | Lathrop | H02J 9/08 307/64 |
| 7,230,344 | B2* | 6/2007 | Pollack | H02J 9/066 290/38 R |
| 7,358,620 | B2* | 4/2008 | Melfi | H02J 9/066 290/1 A |
| 7,400,052 | B1 | 7/2008 | Badger | |
| 7,750,518 | B1* | 7/2010 | Perkins | F16C 25/08 310/89 |
| 8,324,758 | B2* | 12/2012 | Ogg | H02J 9/061 307/65 |
| 9,520,818 | B2* | 12/2016 | Seo | H02J 9/06 |
| 2003/0020330 | A1 | 1/2003 | Cratty | |
| 2005/0077881 | A1 | 4/2005 | Capp et al. | |

OTHER PUBLICATIONS

Communication from European Patent Office for Application No. 13 173 356.0 dated Jul. 19, 2017.

\* cited by examiner

ENERGY STORAGE MODULE COMPRISING A DC LINK

FIELD OF THE INVENTION

The invention relates to an energy storage module comprising a DC link as well as to a method for controlling such an energy storage module.

BACKGROUND OF THE INVENTION

The energy needed to operate a power network is supplied by several different types of power plants. In this context, most power plants such as, for instance, nuclear power plants, coal-burning power plants, natural-gas power plants, wind power plants, biogas power plants or solar power plants are merely energy producers that feed energy into the non-local (or else external) power network. Non-local power networks are, for instance, transmission networks such as those operated in Germany, for example, by Amprion, 50 Hertz, Tennet and TransnetEnBW. These transmission networks are part of the European interconnection grid. As pure energy producers, the above-mentioned power plants cannot absorb surplus energy from the power network and store it if the need arises. Energy storage systems, in contrast, can be employed to absorb energy and release it into a power network. Examples of energy storage systems are centralized energy storage systems such as pumped storage power plants, or else decentralized energy storage systems such as batteries or flywheel energy storage systems. The pumped storage power plants constitute largely weather-independent energy storage systems so that, as a rule, they are always available. Centralized energy storage systems are normally dimensioned for a large capacity. In order to provide an operating reserve for the non-local power network, centralized energy storage systems, owing to the available output, are suitable for such a purpose in the non-local power network. Pumped storage power plants can have an output of several 100 MW or more, depending on their size, although the generators are usually configured to produce electricity at full load and thus can instantaneously utilize the full output of the pumped storage power plant with a corresponding level of efficiency. This mode of operation does not lend itself for stabilizing or improving the local network quality in a power network having a power demand that is quite negligible in comparison to the capacity of the pumped storage power plant.

Centrally employed battery storage systems are currently under construction with the aim of implementing a pilot operation for network-stabilizing (non-location-bound) tasks (operating reserve). The systems planned up until now, however, do not fulfill any location-bound tasks. Fundamentally speaking, however, battery storage systems, owing to their inherent interrelationships between output, capacity and ageing, are not well-suited for such applications involving several load cycles per day, and they degrade quickly due to temperature influences, system failures and faulty operation. For this reason, battery storage systems are very high-maintenance. Moreover, due to their high fire and chemical risks, battery storage systems pose a hazard to the environment and/or to water, thus requiring extensive safeguarding resources.

Decentralized energy storage systems are generally optimized for the stabilization of the local power demand and they are not configured or qualified to supply operating reserve to support the non-local power network. Such systems cannot make a contribution to meeting the demand for all power networks. Up until now, the decentralized storage systems have not been interconnected to form a system that operates locally and non-locally.

U.S. Pat. No. 7,400,052 B1 discloses a transient energy system for a load that, under normal conditions, is fed in via an intermediate DC bus exclusively from the network as the primary power source. If the primary power supply fails, then the load is temporarily supplied with energy via a transient power supply that is likewise connected to the DC bus. In this context, the transient power supply comprises two separate sources of transient power, whereby a flywheel energy storage system is provided as a fast and brief transient power supply in the case of network failure times within the range of 1 second, while a gas turbine with a gas reservoir is provided as the second transient power supply for bridging longer network failures. Here, in case of a network failure, during a first, brief time interval, it is exclusively the flywheel energy storage system that supplies power to the DC bus, whereas during the subsequent second time interval, the flywheel energy storage system as well as the gas turbine power plant feed energy into the DC bus and, during the subsequent third time interval, only the gas turbine power plant feeds energy into the DC bus, while the flywheel energy storage system is recharged from the DC bus. Therefore, the gas turbine power plant also takes over the power supply of the flywheel energy storage system which, under normal conditions, takes place by means of the grid, which is not available during transient operation. In order for such energy storage installations to be able to reliably fulfill their tasks, they have to be equipped with transient aggregates so that they can bridge network failures during the first and second time intervals. In the case of network failures lasting longer, the gas turbine power plant itself can take over the transient power supply as the source of energy and consequently, it has to be dimensioned to be sufficiently large, which is complicated and restricts the mobility of decentralized energy storage units, thus rendering their operation more difficult. In this context, the suppliers, namely, (a) the flywheel energy storage system and (b) the gas turbine power plant, feed energy into the DC bus only in case of a network failure and, in U.S. Pat. No. 7,400,052 B1, they are not employed to supply the operating reserve to support the external power network while the grid is available. Moreover, here, the operating aggregates of the flywheel energy storage systems are not fed from the DC bus and consequently, they need to have a separate power supply.

For this reason, it would be desirable to have access to an effective, environmentally friendly, fail-safe and easy-to-operate energy storage system having a large capacity that, depending on the demand, can feed energy into connected external power networks or else can absorb energy from them and, in the case of a network failure, can nevertheless remain ready for operation.

SUMMARY OF THE INVENTION

Before this backdrop, it is the objective of the invention to provide an effective, environmentally friendly, fail-safe and easy-to-operate energy storage system having a large capacity that, depending on the demand, can feed energy into connected external power networks or else can absorb energy from them and, in the case of a network failure, can nevertheless remain ready for operation.

This objective is achieved by means of an energy storage module for the reversible storage of electric energy, comprising several flywheel energy storage units that are electrically connected in parallel via a shared DC link, comprising a first regulation system that is connected to the DC link and that, during normal operation, connects the DC link to one or more external power networks in order to absorb energy from or release energy into the external power network(s), and comprising a second regulation system having an input side and an output side, whereby the input side is connected to at least the DC link, while the output side is connected to an internal supply network for purposes of supplying one or more electrically powered operating aggregates that are needed to operate the flywheel energy storage units, whereby the second regulation system is configured to connect the DC link to the internal supply network, at least during emergency operation when the external power network is absent, and to supply the supply network with the requisite supply power only from the DC link in order to ensure the continued operation of the flywheel energy storage units, at least during a first time interval.

Through the use of flywheel energy storage units, the energy is stored in the form of mechanical rotational energy. This modality of energy storage does not require any chemically hazardous and/or fire-hazardous materials, so that such storage systems do not pose a risk to the environment and/or to the water. Thanks to the parallel electric connection of the individual flywheel energy storage units to a DC link, very little technical effort is needed to combine the individual capacities per unit and outputs per unit of the individual flywheel energy storage units in order to create a shared module storage capacity and module output for the energy storage module. Moreover, in principle, any desired number of flywheel energy storage units can be electrically connected in parallel to the DC link, as a result of which the module capacity and the module output can be adapted to the demand and, in principle, can be scaled as desired for the energy storage module. This provides an energy storage module with a large capacity that makes it possible not only to improve the local network quality in local power or current networks (for instance, AC networks) but also to achieve supply reliability for non-local power or current networks (for instance, AC networks).

When only one large network inverter is employed as the first regulation system, there are fewer losses than when several small network inverters are used, for instance, if all of the flywheel energy storage units had been connected separately from each other to a power network with their own network inverters. Moreover, the use of only one large network inverter is more cost-effective than the use of several smaller network inverters. The energy storage module according to the invention can thus be employed as an energy storage system with sufficient efficacy for both purposes. The energy storage module can also be operated very effectively since the module storage capacity and the module output provided can be adapted to the particular requirements by a suitable selection of the number of flywheel energy storage units that are connected to the DC link, as a result of which unutilized overcapacities can be avoided. Furthermore, it is easy to regulate the DC link to a target direct voltage, which simplifies the overall regulation of the energy storage module. Moreover, the electrically parallel arrangement of the flywheel energy storage units translates into error-redundancy, thereby preventing the failure of one flywheel energy storage unit from substantially impairing the availability of the energy storage module for its regulation and system tasks in the connected external power networks (for instance, AC networks). This enhances the failure safety of the energy storage module. In this context, the target direct voltage depends on the connected external power networks and on the components used in the energy storage module.

A technically significant range for the voltage in the DC link when the installation is connected to a low-voltage network is, for example, between 550 V and 1000 V. The lower limit is defined essentially by the voltage condition of the low-voltage network, whereas the upper limit is essentially determined by the technical properties of the components employed in the energy storage module. In medium-voltage networks or DC networks, for technical and financial reasons, the target direct voltage in the DC link can also have different values that are based on the voltage condition of these networks. In one embodiment, the target direct voltage in the DC link is 750 V±5 V. The momentary values of the direct voltage in the DC link can be ascertained by means of a suitable configuration of the first regulation system, by means of an appropriate measuring device in the DC link and/or by means of the motor control means of the flywheel energy storage units, and these values can subsequently serve as the basis for the regulation. In this process, the direct voltage of the DC link is supported exclusively by the flywheel energy storage units and, while the external power network is available (normal operation of the energy storage module), also by the first regulation system via the connected external power network(s). Additional power sources of a different type are not connected to the DC link. During normal operation, no other power sinks are connected the DC link. In the case of a network failure, even in the case of a prolonged network failure lasting, for instance, several hours or more, the direct voltage in the DC link is supported exclusively by the flywheel energy storage units. This operating state is referred to as emergency operation.

The term "flywheel energy storage unit" refers here to the functional unit comprising a rotor as the flywheel mass by means of whose rotation the energy is stored in the form of mechanical rotational energy, comprising operating aggregates such as bearing components and motor components that serve to accelerate, decelerate and turn the rotor at a given rotational speed, comprising an electromagnetic transformer to convert electric energy into mechanical energy and vice versa as well as comprising connections to other operating aggregates such as, for instance, the vacuum system or an internal power supply via the internal supply network. Depending on the load state, the rotors of flywheel energy storage units can even rotate at rotational speeds of 50,000 rpm. A typical rotational speed range lies between 15,000 rpm and the maximum rotational speed. The individual flywheel energy storage units have a capacity per unit and an output per unit that depend on the operating conditions such as, for example, the rotational speed of the rotor and the configuration of the electromagnetic transformer. For instance, the capacity per unit can be about 5 kWh and the maximum output per unit can be up to 200 kW. The storage of the energy in the form of rotational energy is reversible since, if necessary, the energy stored as rotational energy can be once again absorbed from the flywheel energy storage units and can then be fed as electric energy via the DC link and via the regulation system into an external power network, and vice versa. Flywheel energy storage systems have the advantage that they can provide the consumers with the amounts of energy that are to be absorbed or released in a very flexible and precise manner, and they can also store this energy in the form of mechanical energy. Therefore, flywheel energy storage systems pose a far smaller potential risk in case of fire than, for instance, a large array of batteries that are interconnected as a battery energy storage installation, or than hydrogen storage installations having hydrogen tanks containing flammable hydrogen or compressed air tanks. Thus, flywheel energy storage units constitute an environmentally safer technology for the provision of energy in comparison to other storage technologies and they are also well-suited for any desired number of load cycles per day. When it comes to the provision of energy or power, one speaks of negative energy provision (energy flow) or negative power provision (power flow) "En" when energy or power is absorbed from the external power network and/or from the DC link and then stored in the flywheel energy storage units in the form of mechanical rotational energy. Correspondingly, one speaks of positive energy provision (energy flow) or positive power provision (power flow) "Ep" when the energy or power stored in the form of mechanical rotational energy obtained from the flywheel energy storage units by decelerating the flywheels (or rotors) is fed as electric energy or power into the external power network and/or into the DC link. In this context, the capability of flywheel energy storage systems to make energy available within just a few milliseconds is an advantageous aspect, and so is their capability to deliver the specified power over a period of time of several minutes or more. At a rotational speed of, for instance, 50,000 rpm, an output of up to 200 kW, depending on the configuration, can be absorbed or released. In one embodiment, the number of flywheel energy storage units in the flywheel module is adapted to provide a module storage capacity for the energy storage module that is at least sufficient to be able to feed rated current into a non-local power network over a period of time of more than 30 seconds.

For the operation of the energy storage module, especially for the operation of the flywheel energy storage units, this module comprises a plurality of operating aggregates such as, for instance, a flywheel motor, an inverter, a vacuum system with vacuum pumps, a cooling system with cooling aggregates, a module control unit and various other components and sensors that are to be operated electrically. All of these operating aggregates have to be supplied with electric energy in order to ensure trouble-free normal operation. For example, a cooling system that has failed would cause overheating of the flywheel energy storage units, especially of the bearings of the rotors in the flywheel energy storage units. Since these rotors have to be operated in a vacuum, for example, of less than $10^{-3}$ bar in order to keep the friction losses as low as possible during normal operation, a failure of the vacuum system would lead to an elevated energy loss, which would automatically cause a rise in temperature due to the friction heat in the energy storage module. An internal supply network for the operating aggregates that is no longer being supplied by the external power network would likewise collapse within a short period of time, as a result of which the operating aggregates would fail, giving rise to commensurately negative consequences for the energy storage module.

However, since, in the case of such a failure of the external power network, as a rule the energy storage module still has a considerable amount of energy stored at a typical mean charge level of 50% and since this energy can be released into the DC link over a prolonged period of time depending on the demand, the flywheel energy storage systems can function as an internal emergency power supply for the operating aggregates via the DC link, without an additional, complex emergency power supply unit that would require extra maintenance having to be installed in the energy storage module and then having to be monitored and maintained. Owing to the connection of the DC link via the second regulation system to the internal supply network—to which, in turn, the operating aggregates (operating aggregates of the individual flywheel energy storage units and operating aggregates of the energy storage module to operate the flywheel energy storage units) are connected—the energy present in the flywheel energy storage units can be made available to the internal power network simply and reliably until the external power network that serves to supply the internal supply network is once again available. In this manner, it is possible to bridge network failures of several minutes or more during which the energy storage module remains operational for the external power network that is to be re-connected later on. Thus, an emergency power supply in the form of a gas turbine, diesel generators or emergency batteries can be dispensed with, thereby reducing the components needed to ensure a fail-safe operation of the energy storage system. The reduction in the number of components concurrently allows a more effective, more environmentally friendly and simpler operation since there is no need to provide and maintain any additional emergency power aggregates. Since such additional emergency power aggregates can be avoided, it is easier to deploy the energy storage module as a compact mobile unit that can be flexibly employed for a limited period of time at different geographical locations. The internal power supply from the DC link makes it possible to bridge a network failure of limited duration and, in the case of a more prolonged network failure, it allows the flywheel energy storage units to be ramped down in a controlled manner within the scope of a stop mode, employing the residual energy contained in the flywheel energy storage units. If it were not possible to supply energy from the DC link to the operating aggregates, a network failure would lead to an uncontrolled emergency OFF or to a collapse of the flywheel energy storage units, conceivably with resultant damage to the energy storage installation.

The energy storage module according to the invention provides an effective, environmentally friendly, fail-safe and easy-to-operate energy storage system having a large capacity for purposes of carrying out regulation and system-related tasks in external power networks whereby, depending on the demand, said system can feed energy into connected external power networks or else can absorb energy from them and, in the case of a network failure of limited duration, can remain ready for the subsequent normal operation.

In this context, during normal operation when an external power network is available, the first regulation system regulates the energy flow between one or more connected external power networks (local power network and/or non-local power network) and the flywheel energy storage units of the energy storage module. In this process, the first regulation system regulates the direct voltage of the DC link so that it remains essentially constant at a target direct voltage of, for example, 750 V. The expression "essentially constant" means that the direct voltage can nevertheless fluctuate temporarily within permissible tolerances of, for instance, ±5 V, whereby the first regulation system always regulates in such a way that the actually present direct voltage of the DC link is corrected toward the target direct voltage or else it matches it in the ideal case. However, the tolerance range can also be greater than the above-mentioned values. The first regulation system effectuates this regulation in that, depending on the direction of the power flow, it makes use of the external power network or of the external power networks as an inexhaustible source of power (charging the flywheel energy storage units with energy) or as a sink for the surplus energy in the DC link. For this purpose, suitable first regulation systems comprise one or more network inverters or flyback converters. This type of regulation by means of the first regulation system applies only to normal operation since, if the external power networks are absent, they are no longer available as energy sources or sinks to the energy storage module.

In the energy storage module according to the invention, the second regulation system, (a) during normal operation as well as during emergency operation, can connect the supply network to the DC link in order to supply the supply network with energy from the DC link, and it is correspondingly controlled for normal operation as well as for emergency operation, or else, (b) only during emergency operation, the second regulation system establishes a connection of the supply network to the DC link in order to supply the supply network with energy from the DC link during emergency operation. In the latter case, the supply network is provided with energy directly from an external power network during normal operation. In contrast, in the first case, there would be no need for a separate connection of the supply network to an external power network since this connection already exists indirectly via the DC link and via the first and second regulation systems.

In one embodiment, during emergency operation, the second regulation system regulates the supply network voltage in the internal supply network in an essentially constant manner in that, depending on the demand, it supplies power from the DC link. In this process, during emergency operation when the external power network is absent, the second regulation system regulates the energy flow between the DC link and the internal supply network, a process in which the second regulation system regulates the supply voltage to a target voltage for the internal supply network. Depending of the embodiment, the supply network here can have different supply voltages, for instance, 240 V-AC or 230 V-AC, or else 110 V-DC or 24 V-DC, or else it is split into several sub-supply networks, if applicable with different sub-supply network voltages. The expression "essentially constant" means that the voltage can nevertheless fluctuate temporarily within permissible tolerances of, for instance, ±5 V, whereby the second regulation system always regulates in such a way that the actually present voltage of the internal supply network is corrected toward the target voltage or else it matches it in the ideal case. The second regulation system effectuates this regulation in that it makes use of the DC link as a quasi-external and quasi-inexhaustible source of power. The expression "quasi-external" refers to the arrangement of the energy source (DC link) outside of the supply network from where the internal supply network is supplied with energy. The expression "quasi-inexhaustible" refers here to the large difference between the large amount of energy that, as rule is, available via the flywheel energy storage system and the relatively small amount of energy that is consumed per unit of time by the operating aggregates and that consequently has to be subsequently supplied to the internal supply network from the DC link. For this purpose, suitable second regulation systems comprise one or more network inverters or flyback converters.

In one embodiment, the input side of the second regulation system is additionally connected to an external power network and the second regulation system is configured to provide the supply power for the internal supply network from the external power network during normal operation, and from the DC link during emergency operation. Consequently, only during emergency operation does the second regulation system need to regulate the power flow from the DC link to the supply network and, during normal operation, it would not be called upon, for example, to convert the direct voltage into a conceivable alternating voltage in the supply network (as an AC network), but rather, it would already be offered this alternating voltage by the external power network and would merely have to regulate it to the target voltage in the supply network. Thus, the second regulation system would be much less involved from a control engineering standpoint. Moreover, in this manner, the need for an additional separate component to connect the internal supply network to the external power network could be avoided if there is a desire for a connection of the internal supply network to an external power network.

In another embodiment, the energy storage module is configured to continuously monitor the direct voltage in the DC link, and the flywheel energy storage units each have motor control means which, independently of a module control unit for controlling the flywheel energy storage units during normal operation, are configured so that, in the case of emergency operation—at least on the basis of the monitored direct voltage—they do not allow the direct voltage in the DC link to fall below a lower threshold value in that they release energy from the appertaining flywheel energy storage units, at least as long as the amount of energy stored in the appertaining flywheel energy storage units has not fallen below a minimum energy level. For purposes of a support operation of the internal supply network, the voltage in the DC link must not fall below the voltage in the supply network. Preferably, the voltage in the DC link is kept at a value between the target voltage during the normal operation and the target voltage of the internal supply network, which is done by feeding in energy from the flywheel energy storage units. In this embodiment, the lower threshold value would be the target value of the supply network target voltage. In a preferred embodiment, even in the case of a temporary failure of the external power network, the voltage of the DC link is regulated to the target voltage of normal operation, for example, 750 V. In this embodiment, the lower threshold value would be, for instance, 745 V. In this context, immediately after the renewed presence of the external power network, the energy storage module could once again return to normal operation without a need for adaptation time seeing that it is not necessary to ramp up the voltage in the DC link to the target value since the voltage had already previously been regulated to that value.

In another embodiment, there is at least one measuring device in the DC link for purposes of measuring the direct voltage in the DC link, and said device is connected at least to the appertaining motor control means of the flywheel storage units. This measuring device supplies the motor control means with the momentary direct voltage in the DC link and it can be used to control the flywheel storage units for purposes of regulation to a target voltage. Such a measuring device can very precisely measure the voltage that is present, and with this measured data, it can provide a precise basis for controlling the voltage. Suitable measuring devices for measuring the voltage are known to the person skilled in the art.

In one embodiment, the motor control means of the individual flywheel storage units are connected directly to each other, independently of the module control unit, and they each comprise a flywheel control means which is configured to carry out a jointly coordinated support operation of the direct voltage in the DC link by all of the flywheel storage units during emergency operation. In this manner, the flywheel storage units can respond more quickly to changes in the voltage and can carry out a more precise support operation. The motor control means respond, for example, by one order of magnitude more quickly than the first or second regulation systems. This fast response can be better utilized by means of a direct communication among the flywheel storage units.

In an alternative embodiment, the module control unit is provided not only during normal operation but also during emergency operation in order to transmit to the flywheel storage units the torque specifications that are suitable for the emergency operation so that energy can be released to the DC link. In this context, the module control unit can be configured for a time-related generation and transmission of the torque specifications for the flywheel storage units, in response to which, during emergency operation, the flywheel storage units feed power into the DC link on the basis of the time-related torque specifications so that the voltage potential in the DC link is regulated to the most constant value possible above the threshold value. For this purpose, each flywheel storage unit receives individual torque specifications from the module control unit. Owing to this individual control of the individual flywheel storage units, different load states of the individual flywheel storage units can be taken into account, so that, whenever possible, the rotational speed of none of the flywheel storage units falls below a minimum value since otherwise, optimal bearing and operation of the rotor of the flywheel storage unit in question would no longer be possible in the case of a disadvantageously low rotational speed.

In one embodiment, in order to attain an optimal energy feed (or energy absorption), each of the flywheel storage units comprises an electromagnetic transformer that is electrically connected to the DC link via a motor control means, preferably a frequency converter. The electromagnetic transformer will also be referred to below as a motor. The motor control means is connected via data lines to the module control unit so that it can receive target value specifications (for example, torque specifications) and, within the framework of its power and output limitations, it can receive (be charged with, absorb energy) any desired amount of power from the DC link or else release it (discharge or release energy) into the DC link. In this context, all of the components of the DC link are configured in such a way that any mutual influence such as, for example, a short circuit or an oscillation of the DC link is ruled out.

In order to make it possible to adapt the control of the flywheel storage units individually to their load state, in one embodiment, the module control unit queries the momentary rotational speeds of the individual flywheel storage units from their motor control means and, based on the queried rotational speed, determines the appertaining momentary load state of the individual flywheel storage units on the basis of the relationship between the rotational speed and the load state stored in the module control unit. The possible rotational speeds can vary between a maximum and a minimum rotational speed (in the extreme case, no rotation), whereby the load state is 100% at the maximum rotational speed. Consequently, the momentary load state results from the momentary rotational speed in each case. The rotational speeds can be queried periodically, for example, at a frequency of 1 Hz. The rotational speed here can be queried in response to an active querying signal to this effect, which is sent by the module control unit, or else it can take place autonomously by means of the module control unit (passive querying by the module control unit). The autonomous transmission by the motor control means can take place continuously or only after the rotational speed has changed by a prescribed value. A typical rotational speed range during normal operation is, for instance, 300 Hz to 800 Hz±5% as the permissible tolerance range.

In one embodiment, an upper rotational speed limit and/or a lower rotational speed limit are implemented in the motor control means of the flywheel storage units. This rotational speed limitation present on site (in the flywheel storage units) serves to protect the machine, namely, against overcharging of the flywheel storage unit, or else to provide protection against exhaustive discharging. In a preferred embodiment, the upper rotational speed limit and/or a lower rotational speed limit are implemented by means of a component, for instance, a separate microcontroller. However, the rotational speed limit can also be implemented by means of a software program in the motor control means. A so-called hardware installation in the form of the additional component ensures proper functioning of the rotational speed limit irrespective of the functional state of the motor control means. By the same token, suitable hardware measures are implemented in the motor control means in order to limit the maximum torques or power amounts into or out of the DC link.

In another embodiment, upper rotational speed limits and/or lower rotational speed limits for the rotational speed specifications are implemented in the module control unit. In a preferred embodiment, the rotational speed limits are implemented as instructions in a computer program so that any rotational speed limits that might have changed can be effectuated quickly. The rotational speed limits in the module control unit do not have to be the same rotational speed limits as the ones in the motor control means. The latter serve to protect the machine. In contrast, the rotational speed limits in the module control unit can serve to control the energy storage module within a particularly effective rotational speed range. In this context, the upper or lower rotational speed limits in the module control unit are at values that are not higher or lower than the upper or lower rotational speed limits in the motor control means. In this embodiment, the rotational speed limits or the maximum torques and currents in the motor control means are taken into account by the module control unit when the torque specifications that are to be transmitted are being calculated.

In one embodiment, the energy storage module comprises one or more measuring units to continuously measure the voltage quality of the external power networks connected to the energy storage module, whereby the measuring unit or units is/are configured to emit an emergency operation signal within the energy storage module in case of an overvoltage or an undervoltage in at least one of the connected external power networks. In this context, the energy storage module, especially the second regulation system, is configured to switch over from normal operation to emergency operation as an automatic response to the emergency operation signal. In the event of a malfunction or failure of the external power network or networks, it/they have to be disconnected from the energy storage module and emergency operation is initiated. Owing to the continuous measurement, the measuring units allow an early detection of a possibly hazardous undervoltage or overvoltage in the external power network, so that the disconnection from the grid protects the energy storage module from being damaged, thus enhancing the failure safety of the energy storage module. The measuring units here can be integrated into the external power networks or else they can be arranged in one or more places in the external power networks. The measuring units can also be arranged at the connection point between the energy storage module and the external power networks. The expression "measuring units" as set forth within the scope of the present invention refers, for example, to measuring probes that measure the network frequency and the network voltage as examples of relevant data for the connected local power network. Other measured variables are, for instance, the voltage course as a function of time, the phase angle, the star points, the network frequency, the network current as well as other variables. At the desired network frequency of an external AC network of 50 Hz, on the basis of a drop in the network frequency, the measuring units can ascertain whether the external power network is breaking away at that moment or not. Other examples of measured variables are the measurement of the phase angle in a local AC network, or the voltage measurement in the case of too much or too little load absorption in the external power network in order to maintain the voltage quality. In this context, the second regulation system is configured to supply the internal supply network with the requisite supply from the DC link in response to the emergency operation signal.

In another embodiment, the module control unit controls not only the operation of the energy storage module during normal and emergency operation but also the switch-over from normal operation to emergency operation. Preferably, the DC link is likewise disconnected from the external power network, whereby this disconnection can also be initiated directly by the measuring units.

In another embodiment, the first regulation system is configured to disconnect the DC link from the external power network in response to the emergency operation signal. The first regulation system controls the energy flow to the connected external power networks in the manner prescribed by the module control unit. In another embodiment, the first regulation system is configured to disconnect only the failed external power network when there are several connected external power networks. In any case, a disconnection by the first regulation system can take place immediately within just a few milliseconds. This avoids damage to the energy storage module, which enhances the failure safety of the energy storage module in the future, so that it remains operational for any additional connected external power networks as well as for the internal support operation of the internal supply network. Otherwise, a short circuit or an overload situation might occur. In another embodiment, for this purpose, the regulation system comprises a control box with at least one controlling element as well as one or more disconnecting switches which are controlled by the controlling element and whose number depends on the number of external power networks connected to the regulation unit. In this context, the control box is connected either directly or via the regulation system to the module control unit and/or to the measuring unit via a data line, by means of which the module control unit can transmit configuration data of the regulation function to the controlling element. Here, as an alternative or in addition to the first regulation system, the second regulation system can be configured to disconnect the internal supply network from the external power network in response to the emergency operation signal. As a result, the disconnection from the external power network as well as the connection of the DC link to the internal supply network can be carried out in a shared component. Therefore, further control communication via the module control unit can be dispensed with and both procedures can be carried out immediately in the second regulation system in response to the emergency operation signal, for which purpose the appertaining switches of the second regulation system are preferably already connected to each other by hardware. Consequently, the external power network can be disconnected and the DC link for the support operation of the internal supply network can be added within just a few milliseconds, as a result of which a voltage fluctuation in the supply network and thus also a conceivable failure of the operating aggregates can be prevented. In another embodiment, for this purpose, the second regulation system comprises a control box with at least one controlling element as well as one or more disconnecting switches which are controlled by the controlling element and whose number depends on the number of external power networks connected to the regulation unit. In this context, the control box is connected either directly or via the second regulation system to the module control unit and/or to the measuring units via a data line, by means of which the measuring units and/or the module control unit can transmit configuration data of the regulation function to the controlling element.

In another embodiment, the measuring units are configured to send a normal operation signal within the energy storage module once the external power network is available again, preferably directly to the module control unit. In this context, the energy storage module, preferably the module control unit, is configured to change over from emergency operation to normal operation as an automatic response to the normal operation signal, whereby the DC link and the internal supply network are once again connected to the external power network(s). In this manner, the normal power supply is automatically reestablished, thus preventing the energy storage module from persisting in the emergency operation mode despite the presence of the external power network, which would cause the energy storage module to run at no load.

In another embodiment, the module control unit is configured to adapt the control of the operating aggregates to internal operating data. In this context, the internal operating data preferably encompasses thermal loads in the energy storage module such as those from the flywheel storage units or from other operating aggregates such as, for example, vacuum systems, a heating or cooling system or other supply systems. This enhances the efficiency of the energy storage module. The internal electric losses can be minimized by systematically influencing the operating behavior or the operating point of the operating aggregates as a function of installation-internal or external momentary measured variables. For instance, the flow temperature of a cooling machine—as an example of an operating aggregate—can be raised or lowered, depending on the momentary internal or external loads. This is particularly advantageous during emergency operation, when the energy available in the energy storage module should be employed very effectively so that even prolonged failures of the external power network can be bridged. For instance, a reduction of the waste heat of the flywheel storage units means that the cooling output of the cooling machine can be reduced, which translates into savings in terms of the operating energy needed for the cooling machine. In another example, the output of a vacuum pump for generating an operating vacuum in the flywheel storage systems can be operated in the clocked mode or can even be completely switched off, depending on the internal pressure of the energy storage means. Such measures save operating energy, thus increasing the efficiency during normal operation and prolonging the possible duration of a support operation of the internal supply network at a prescribed load state of the flywheel energy storage systems, thereby making it possible to provide a more effective and fail-safe energy storage module.

In another embodiment, the energy storage module additionally comprises one or more power sinks that are connected to the operating aggregates. This translates into a further absorption of additional energy when the flywheel storage units are fully charged. For example, the capacity of the energy storage module to absorb external electric power (for example, primary or secondary operating reserve from one of the AC networks) through a systematic utilization of a cooling installation having a primary and a secondary cooling circuit in that the secondary cooling circuit is at the same time cooled by the primary circuit and electrically heated, for instance, by means of an immersion heater in the reservoir as the first power sink, which translates into greater cooling capacity of the primary cooling circuit (greater power absorption of the cooling machine as the second power sink). Depending on the environmental conditions or on the installation operating point, the increase in the module storage capacity above the nominal sum of the storage capacity per unit of the individual flywheel storage units can be intentionally increased above the level needed for normal operation by absorbing (electric) power from the cooling system and/or from the vacuum system, as a result of which a greater amount of energy is available for emergency operation so that, by means of the support operation of the supply networks, even more prolonged failures of the external power network can be bridged without any problems. Such a stored cooling quantity or the additionally achieved vacuum level below a target value, both of which are available due to the fact that there are operating aggregates that are not being operated and are thus saving on energy consumption, can be saved and can therefore be utilized at a later point in time in case of an elevated or prolonged demand.

Consequently, the energy storage module according to the invention constitutes an energy storage system that can be used quickly and flexibly at any desired location while entailing little effort. In one embodiment, the energy storage module is configured as a mobile unit in a transportable container. Here, the energy storage module is configured to be connected via the first regulation system to an external power network (local or non-local network), or else, if the first regulation system is suitably configured, to one or more external power networks, for instance, one or more local networks and/or non-local networks. The release of energy into the external power network(s) or the absorption of energy from the external power network(s) takes place on the basis of the torque specifications and this is done by the module control unit which, in turn, can receive control specifications from an external source. Such control tasks can be, for instance, regulation and system tasks which are to be carried out in the connected external power networks and which serve as the basis for the torque specifications. In this context, the regulation and system tasks are divided into location-bound regulation and system tasks for local power networks and into non-location-bound regulation and system tasks for non-local power networks. Here, in order to carry out the non-location-bound as well as the location-bound regulation and system tasks, the energy storage module can either be connected directly to a non-local power network and to one or more local power networks, or else it can be connected indirectly to a non-local power network via a connected local power network, provided that the local power network itself is connected to the non-local power network.

The module control unit makes it possible for the energy storage module to carry out different regulation and system tasks—if applicable—in separately connected local and non-local power networks, thus bringing about a simultaneous improvement in the local network quality in the local power networks and in the supply reliability in non-local power networks. The expression "location-bound regulation and system tasks" refers to local power networks (for instance, local AC networks) and comprises, for example, the safeguarding of the requisite network voltage, the compensation for reactive power by regulating the amplitude angle and the phase angle of the voltage signal, the provision of a local power reserve for larger power consumers that may have been connected or for switch-on current peaks as well as for the storage of local energy surpluses. In this context, the expression "non-location-bound regulation and system tasks" refers to non-local power networks (non-local AC networks) and comprises, for instance, the provision of a primary or operating reserve. The operating reserve (also reserve power) ensures the stability of the network in the case of unexpected occurrences in the power network. For this purpose, brief output adaptations can be carried out for regulatable power plants, and power plants or energy storage systems that ramp up quickly such as the energy storage module according to the invention can be employed. Examples of other non-location-bound regulation and system tasks are also the black start support in the case of a network failure, the general storage of power peaks and the compensation for reactive power in the non-local power network. Other location-bound and non-location bound regulation and system tasks for local and non-local power networks are the provision of redundancies (failure safety) for the power supply in combination with the already present energy suppliers and reactive power management.

In this context, the expression "non-local power network" designates, for instance, an AC network which extends trans-regionally over very large areas and in which the non-location-bound regulation and system tasks are carried out. Examples of non-local power networks are transmission or distribution networks (public power grid). The public power grid in Germany consists, for example, of four transmission networks that are operated by the network operators Amprion, 50 Hertz, Tennet and TransnetEnBW. These four transmission networks together form the interconnection grid for Germany. Subsidiary to these are the regional distribution networks. In other countries, corresponding transmission networks are operated by other network operators. The frequency of the power network is kept stable (frequency regulation) in the transmission networks. The superordinated European interconnection grid consisting of the appertaining transmission networks in the individual countries should likewise be seen as a non-local power network, for which, however, only the standards for operating reserve have been stipulated at the present time. The non-location-bound regulation and system tasks are carried out in the appertaining transmission networks. A local power network as set forth in the invention also refers, for example, to an AC network in which the location-bound regulation and system tasks described above are carried out. As a rule, local power networks are physically limited, for instance, a plant-internal power network in the plant facilities or a power network within a single building or a building complex.

The module control unit is a component in the energy storage module that controls the energy storage module, that is to say, that sets the desired operating states (for example, normal operation or emergency operation) and operating parameters, and that controls the energy storage module in accordance with an operating plan that contains the desired operating states as a function of time. The location-bound and non-location-bound regulation and system tasks (control instructions) serve as the basis for the operating plan. In order to control the energy storage module, the module control unit is connected via appropriate data lines, for instance, a data bus system such as, for example, a CANbus, a PROFIBUS (Process Field Bus) or in the form of Ethernet, to the appertaining components in the energy storage module, comprising the first and second regulation systems and the flywheel storage units.

In another embodiment, the motor control means of all of the flywheel storage units are configured to continuously monitor the direct voltage in the DC link with regard to the upper threshold value and, at the latest when the upper threshold value has been exceeded, to autonomously prevent any power flow from the flywheel storage units into the DC link. In spite of the regulation of the direct voltage in the DC link so that it is as constant as possible, an excessively high direct voltage in the DC link might occur due to extraordinary external network states (major incidents), for instance, a high amount of energy being fed briefly into an AC network from a source outside of the energy storage module. In the case of regulation and system tasks that have just been carried out and that would lead to energy being fed from the energy storage module into the external power network, the direct voltage in the DC link might rise above a critical power level if the connected external network(s) is/are not able to absorb this energy as a sink, as is done under normal conditions since they themselves precisely constitute a source of energy. For this reason, in order to protect the installation, the motor control means of the individual flywheel storage units autonomously interrupt (prevent) the feeding in of energy, independently of the pending regulation and system tasks. The prevention of any power flow from the flywheel storage units into the DC link can also take place, even when the upper threshold value has not been exceeded, if the direct voltage is coming too close to the upper threshold value, for instance, if the difference between the direct voltage in the DC link and the upper threshold value has fallen below a value that has been defined as critical in the motor control means.

The invention also relates to a method for controlling an energy storage module according to the invention, comprising the following steps:
  energy from a shared DC link to which several flywheel storage units are electrically connected in parallel is released into or absorbed from one or more external power networks that are connected to the DC link via a first regulation system,
  the one or more operating aggregates needed to operate the flywheel storage units are supplied with the energy required to operate the operating aggregates during the normal operation of the energy storage module via an internal supply network, whereby the supply network is connected to an output side of a second regulation system whose input side is connected at least to the DC link,
  the energy storage module is switched over from normal operation to emergency operation when the external power network is absent, and
  the internal supply network is supplied with the supply power needed for the continued operation of the flywheel storage units when the external power network is absent, and this is done only from the DC link, at least during a first time interval.

In one embodiment, the method encompasses the following additional step:
  the supply network voltage of the internal supply network is regulated to a constant value in that, depending on the demand, power is supplied from the DC link by means of the second regulation system.

The target voltage in the internal supply network minus a regulation difference corresponds to this constant value.

In another embodiment, the method encompasses the following additional steps:
  the direct voltage of the DC link is continuously monitored, preferably by means of at least one measuring device arranged in the DC link, and
  independently of a module control unit for controlling the flywheel storage units during normal operation, in case of emergency operation, the flywheel storage units are controlled by means of appertaining motor control means in the individual flywheel storage units on the basis of the monitored direct voltage, so that, due to the release of energy from the appertaining flywheel storage units into the DC link, its direct voltage does not fall below a lower threshold value, at least as long as the amount of energy stored in the flywheel storage units does not fall below a minimum energy level, preferably by stipulating time-related torque specifications for the appertaining flywheel storage units.

When the minimum energy level of the energy storage module is reached or when the value falls below that (for example, if the external power network has been unavailable for several days), the remaining energy is employed to effectuate an orderly ramp-down and shut-off of the energy storage module.

In one embodiment, the method comprises the following additional step:
  a jointly coordinated support operation of all flywheel storage units is carried out by means of the motor control means in order to regulate the direct voltage in the DC link to a constant value during emergency operation in that each motor control means encompasses flywheel control means, and the individual motor control means of the flywheel storage units are connected to each other, independently of the module control unit.

In this context, in a preferred embodiment, individual flywheel storage units of the energy storage module can be systematically excluded from the shared support operation in order to provide a minimum amount of energy for a controlled ramp-down of the flywheel storage units. The amount of energy stored in the flywheel storage units that have been excluded from the support operation is reserved for eventually performing a controlled ramp-down and shut-down of all of the flywheel storage units in order to transition the entire installation to a safe stop mode in case of a prolonged network failure.

In one embodiment, the method comprises the following additional step:
  the internal supply network is disconnected from the DC link by means of the second regulation system once the amount of energy stored in the flywheel storage units has fallen below a minimum energy level.

In another embodiment, the method comprises the following additional steps:
  the voltage quality in the external power networks that are connected to the energy storage module is continuously measured employing one or more measuring units of the energy storage module,
  an emergency operation signal is emitted within the energy storage module by at least one measuring unit in case of an overvoltage or an undervoltage in at least one of the connected external power networks, the external power network(s) is/are disconnected at least from the DC link by means of the first regulation system, the flywheel storage units are switched over from normal operation to emergency operation and the internal supply network is supplied with the requisite supply network voltage from the DC link by means of the second regulation system as an automatic response to a drop (fall) in the direct voltage in the DC link or as an automatic response to the emergency operation signal, a normal operation signal is emitted by the measuring units once the external power network becomes available once again, and the energy storage module is switched over from emergency operation to normal operation, and the internal supply network is connected to the external power network(s), preferably by means of the second regulation system, as an automatic response to the normal operation signal.

BRIEF DESCRIPTION OF THE FIGURES

These and other aspects of the invention will be shown in detail in the figures as follows.

DETAILED DESCRIPTION OF THE EMBODIMENTS

Figure 1:
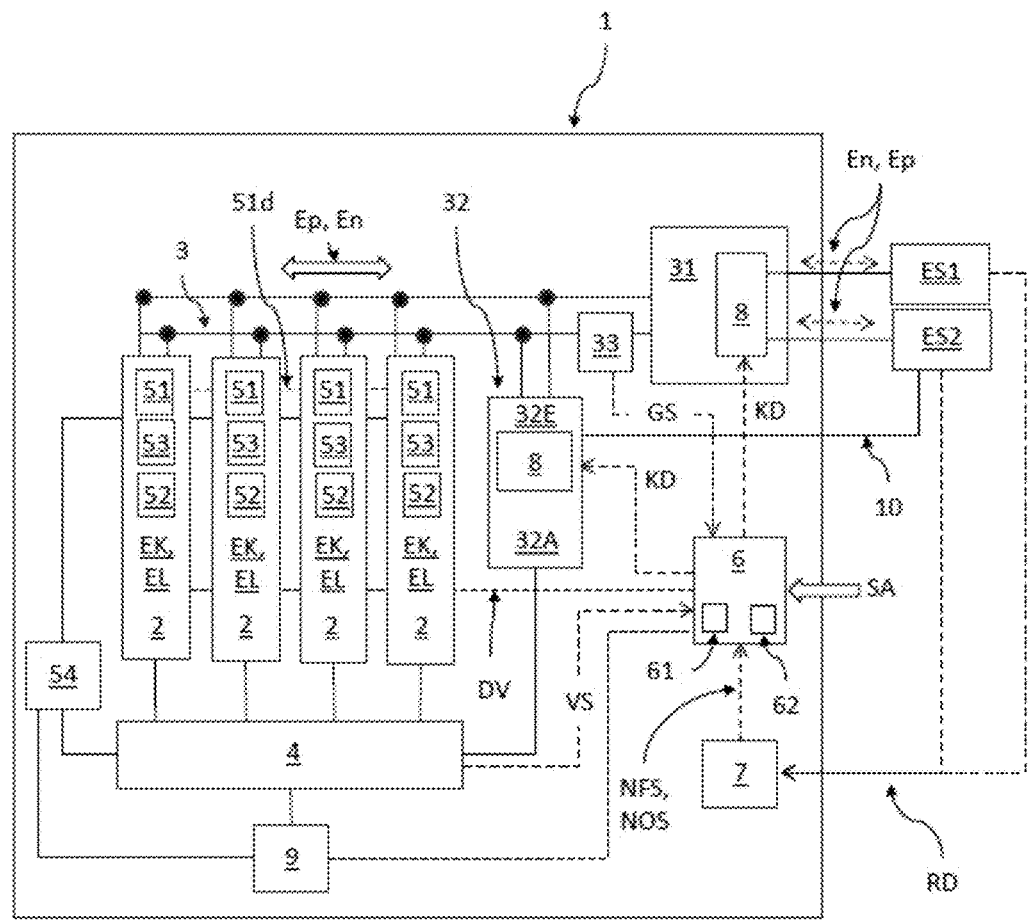
FIG. 1 an embodiment of the energy storage module according to the invention.

FIG. 1 shows an embodiment of the energy storage module 1 according to the invention, for the reversible storage of electric energy in the form of mechanical rotational energy, here comprising four flywheel storage units 2 with appertaining storage capacities per unit and outputs per unit. This low number was selected for the sake of clarity in the schematic depiction. For a real application, an energy storage module comprises, for example, thirty flywheel storage units 2. In this configuration, the above-mentioned individual capacities would yield a maximum storage capacity of 150 kW per flywheel storage device and a maximum output of 0.6 MW per energy storage module. Each of the flywheel storage units 2 comprises an electromagnetic transformer 53 that is electrically connected to the DC link 3 via a motor control means 51, preferably a frequency converter 51. The DC link 3 serves to allow all of the flywheel storage units 2 to be electrically connected in parallel to each other so that the storage capacities EK per unit and the outputs EL per unit can add up to a total module storage capacity and total module output and so that the functionality of the entire energy storage module 1 is not jeopardized by one defective flywheel storage unit. The DC link is connected to two external power networks ES1, ES2 via a first regulation system 31. The module control unit 6 controls the energy storage module 1 by means of torque specifications DV (preferably time-related torque specifications) which the module control unit 6 generates and transmits to the flywheel storage units 2 during operation of the energy storage module 1. On the basis of the torque specifications DV, the flywheel storage units 2 feed energy in the form of current into the DC link 3 or else they absorb energy in the form of current from the DC link 3. Here, during normal operation NO, the regulation system 31 regulates the direct voltage GS in the DC link 3 by releasing Ep energy into at least one of the two external power networks ES1, ES2 or by absorbing En energy from at least one of the two external power networks ES1, ES2 between an upper threshold value SW1 (for instance, the target direct voltage +5V) and a lower threshold value SW2 (for instance, the target direct voltage −5V) so that the direct voltage GS remains essentially constant at a value of, for example, 750 V. Moreover, aside from the first regulation system 31 that keeps the direct voltage GS constant in the DC link 3 between the upper and lower threshold values SW1, SW2, a second regulation system 32 is connected to the DC link 3 on its input side 32E. In one embodiment, the input side 32E can be additionally connected to the power network ES2 in order to supply the internal supply network 4 during normal operation NO. Without this connection, the supply network 4 is supplied with energy indirectly via the first regulation system 31, via the DC link 3 and via the second regulation system 32. During emergency operation NO without external power networks ES1, ES2, the second regulation system 32 carries out off-grid operation (exclusively supplying the internal supply network 4 from the flywheel storage units 2 via the DC link 3). This has the advantage that the energy storage module 1 remains operational with low module-internal resources for the point in time when the external power network(s) ES1, ES2 is/are once again available. As long as the internal supply network 4 is being fed from the DC link 3, the regulation and system tasks remain unprocessed due to the absence of a connection to the external power networks ES1, ES2. If, when the external power network ES2 is absent, the first regulation system 31 remains connected to another external power network ES1 that continues to function, then the internal supply network 4 can also be supplied from the external power network ES1 via the DC link that is fed by means of the first regulation system 31 from the external power network ES1 as well as by means of the second regulation system 32. The first regulation system 31 and the module control unit 6 are also configured to execute this operating state. In order to control the flywheel storage units 2, the module control unit 6 queries the rotational speeds of the individual flywheel storage units 2 from their motor control means 51 and determines a specific momentary load state of the individual flywheel storage units 2 on the basis of the queried rotational speed. For reasons having to do with machine protection, an upper rotational speed limit and/or a lower rotational speed limit are implemented in the form of hardware as a special component 52 (sensor and regulator) in the appertaining motor control means 51 of the flywheel storage units 2. Alternatively or additionally, the rotational speed limits can also be implemented in the module control unit 6, preferably in a computer program executed in a module control unit 6. The lower rotational speed limit is 0 rotations per second at the minimum, whereby it can be technically advantageous to select a higher minimum rotational speed so that the motor system can provide a minimum output needed for operational-technical reasons. In the upward direction, the rotational speed is limited either by the motor converter frequency or else by the sturdiness of the rotor components. Typically, maximum rotational speeds are, for instance, 800 Hz.

The module control unit 6 controls the energy storage module 1 during normal operation NO on the basis of external control instructions SA (regulation and system tasks) which are carried out for the appertaining external AC networks ES1, ES2. The module control unit 6 receives the regulation and system tasks SA in the form of external data via an appropriate data interface (not shown explicitly here) from a network control device located outside of the energy storage module. The torque specifications DV that are to be transmitted to the flywheel storage units 2 are generated by the module control unit 6 on the basis of the received external data. External data is, for example, measured physical quantities, logical quantities, real-time control commands or control commands for sequence control. In one embodiment, the module control unit 6 also comprises a storage unit 61 for storing the external data, especially the regulation and system tasks SA. Moreover, in another embodiment, the module control unit 6 comprises a priority management 62 for carrying out control instructions. In order to control the energy storage module 1, the module control unit 6 draws up an operating plan for carrying out regulation and system tasks SA in the connected external power networks ES1, ES2 and transmits corresponding torque specifications DV to the appertaining flywheel storage units 2; preferably, the torque specifications DV have been adapted individually to the appertaining load states of the individual flywheel storage units 2. In one embodiment, in order for the module control unit 6 to always receive momentary external data for controlling the energy storage module 1, the module control unit 6 checks the proper functioning of the existent communication connection to the outside by sending out a test signal on the basis of which an external system sends back a corresponding return signal. Receipt of the return signal confirms the proper functioning of the communication connection to this external system from which the energy storage module receives its regulation and system tasks SA that are to be carried out, for instance, in the form of external data. In order for this external data to take into account the momentary state of the energy storage module 1, in one embodiment, the module control unit 6 sends the operating data of the energy storage module 1, for example, periodically, to the external system.

In this context, the operating data can encompass the load states of the flywheel storage units 2 and thus the momentary and in principle available module storage capacity and module output, the identity of the energy storage module 1 or the state of other components of the energy storage module 1 as well.

In order for the energy and power flow into the DC link 3 coming from the AC networks ES1, ES2, or else from the DC link 3 into the AC networks ES1, ES2 to be suitably divided for the appertaining AC networks ES1, ES2 so as to fulfill the appropriate regulation and system tasks SA, the energy storage module 1 comprises a control box 8 (in this context, also see FIG. 2) which divides the total energy and power flow coming from the DC link 3 into an energy and power flow EF1, LF1 for the AC network ES1 and into an energy and power flow EF2, LF2 for the AC network ES2. In order to optimally carry out the regulation and system tasks SA in the connected AC networks ES1, ES2, the energy storage module 1 here comprises a measuring unit 7 which continuously measures the voltage quality and/or the current strength for the two AC networks ES1, ES2 and which measures the relevant data RD in order to evaluate the voltage quality and the current strength in the AC networks ES1, ES2. In other embodiments, it is also possible to employ several measuring units 7. The measuring unit(s) 7 is/are configured to send an emergency operation signal NSF within the energy storage module 1, here to the module control unit 6, at least in case of an overvoltage or undervoltage in the external power network ES2 that is connected to the internal supply network 4. The energy storage module 1, especially the second regulation system, is configured here to switch over, as an automatic response to the emergency operation signal NFS, from normal operation NO to emergency operation NF and to disconnect the internal supply network 4 and the DC link 3 from the external power network ES2 or from all external power networks ES1, ES2, whereby, in response to the emergency signal NFS, the second regulation system 32 is configured to supply the internal supply network 4 with the requisite supply network voltage VS from the DC link 3. In order for the second regulation system 32 to be able to regulate the supply network voltage VS to an essentially constant value in the internal supply network 4 during emergency operation NF by supplying energy depending on the demand, the supply network voltage VS can be measured in the supply network 4, for instance, continuously, by suitable means, and the values of the supply network voltage can be transmitted to the module control unit 6. The measuring units 7 are also configured to emit a normal operation signal NOS within the energy storage module 1 when the external power network ES1, ES2 is once again available, whereby the energy storage module 1, here for instance, by means of the module control unit 6, switches over, as an automatic response to the normal operation signal NOS, from emergency operation NF to normal operation NO, and they are also configured to connect the DC link 3 and the internal supply network 4 once again to the external power network(s) ES1, ES2 and, if applicable, to disconnect the electric connection between the DC link 3 and the internal supply network 4 by means of the second regulation system 32. In one embodiment, the external power networks ES1 and ES2 can also be a shared external power network connected to each other.

Examples of suitable measured quantities for obtaining the relevant data RD are the voltage course as a function of time, the phase angle, the star point, the network frequency or the network current. Within the scope of the present invention, the person skilled in the art can select suitable measuring units or measuring probes and can arrange them at the appropriate position. The energy storage module 1 can thus actively disconnect the connection to an AC network ES1, ES2 when prescribed limit values in the AC network ES1, ES2 have been exceeded.

For the operation of the flywheel storage units 2, all of the electrically powered operating aggregates 51, 52, 53, 54 are connected to an internal supply network 4 that, during normal operation NO, is directly or indirectly connected (via the DC link) to the external power networks ES2 in order to supply energy to the operating aggregates 51, 52, 53, 54. In this embodiment, the optional connection 10 of the input site 32E of the second regulation system 32 to the external power network ES2 is depicted by a broken line. The electric connections that are connected to the second regulation system 32 can be regulated by a control box 8; in this context, also see FIG. 3. Here, the second regulation system 32 is connected to the DC link 3 and, during emergency operation NF, in order to ensure the continuous operation of the flywheel storage units 2, it is configured to supply the internal supply network 4 with the requisite supply network voltage VS from the flywheel storage units themselves via the DC link 3, at least during a first time interval T. The direct voltage GS is continuously monitored in the DC link 3, whereby the flywheel storage units 2 each comprise motor control means 51 which—during emergency operation NF, at least on the basis of the monitored direct voltage GS and independently of a module control unit 6 that controls the flywheel storage units 2 during normal operation NO—are configured to release Ep energy obtained from the appertaining flywheel storage units 2 in order not to allow the direct voltage GS in the DC link 3 to fall below a lower threshold value SW2, at least as long as the amount of energy stored in the appertaining flywheel storage units 2 does not fall below a minimum energy level. Here, for purposes of a support operation of the internal supply network 4, the direct voltage GS in the DC link 3 should not fall below the voltage in the supply network. Moreover, the DC link 3 can contain a measuring unit 33 to measure the voltage GS in the DC link 3 which is then transmitted to the module control unit 6. In one embodiment, instead of the motor control means 51, the module control unit 6 can also actuate the flywheel storage units 2 on the basis of the measured voltage GS in such a way that, by releasing EFp energy from one or more flywheel storage units 2 into the DC link 3, its voltage GS does not fall below a lower threshold value SW2, at least as long as the amount of energy stored in the flywheel storage units 2 does not fall below a minimum energy level ME.

For normal operation, the module control unit 6 also controls the absorption EFn of energy from the DC link 3 and its feeding into one or more flywheel storage units 2, if its voltage GS rises above an upper target value SW1. This control takes place, for example, on the basis of the voltage GS measured by means of the measuring units 33. In one embodiment, however, for emergency operation NF, the motor control means 51 of the individual flywheel storage units 2 can also be connected directly to each other, independently of the module control unit 6, and each of them comprises a flywheel control means (not shown explicitly here) which is configured to carry out a jointly coordinated support operation SB of the voltage GS in the DC link 3 through all of the flywheel storage units 2 during emergency operation NF. The direct connection of the motor control means 51 is depicted by a broken line 51*d*.

Aside from the operating aggregates in the flywheel storage units 2 such as, for instance, the motor control means 51, some operating aggregates, e.g., the operating aggregates 54, can also be arranged outside of the flywheel storage units 2 such as, for example, a vacuum system, which is connected via a pipe system (not shown here for the sake of clarity) to the containers for the rotors (centrifugal masses) in the flywheel storage units 2, in order to generate a vacuum of, for instance, less than $10^{-3}$ mbar at rotational speeds of more than 40,000 rpm, which is necessary to ensure that the rotors rotate with the lowest possible losses at high rotational speeds. Another operating aggregate 54 can be a cooling unit to dissipate operating heat from the energy storage module 1. The module control unit 6 can be configured to adapt the control of the operating aggregates 54 to the received internal operating data or to external data, which is why the operating aggregates 54 are also connected to the module control unit 6. The internal electric losses can be minimized by systematically influencing the operating behavior or the operating point of the operating aggregates 54 as a function of installation-internal or external momentary measured quantities. For instance, the flow temperature of a cooling machine 54—as an example of an operating aggregate 54—can be raised or lowered, depending on the momentary internal or external loads. For instance, a reduction of the waste heat of the flywheel storage units 2 means that the cooling output of the cooling machine 54 can be reduced, which cuts down on the operating energy needed for the cooling machine 54. In another example, the output of a vacuum pump in the vacuum module 54 for generating an operating vacuum in the rotor containers of the flywheel energy storage systems 2 can be operated in the clocked mode or can even be completely switched off as a function of the outgas sing behavior of the centrifugal masses (rotors). Such measures save on operating energy and therefore increase the temporary efficiency by up to 10%, thus allowing the provision of a more effective energy storage module 1.

In this embodiment, the energy storage module 1 additionally comprises a power sink 9 which is connected to one or more of the operating aggregates 51, 52, 53, 54 and with which a further absorption of additional energy is made possible when the flywheel storage units 2 are fully charged. For instance, the module storage capacity of the energy storage module 1 to absorb external electric power (for example, primary or secondary operating reserve from one of the AC networks ES1, ES2) can be increased by systematically utilizing a cooling installation 54 having a primary and a secondary cooling circuit in that the secondary cooling circuit of the cooling installation 54 is heated electrically, for instance, with an immersion heater in the coolant reservoir that has a volume, for example, of 400 liters (e.g. a water tank) as the first power sink 9, which translates into greater cooling capacity of the primary cooling circuit (greater power consumption of the cooling machine 54 as the second power sink). Depending on the environmental conditions or on the installation operating point, the module storage capacity can be intentionally increased beyond the nominal sum of the storage capacities EK per unit of the individual flywheel storage units 2 by means of the (electric) power consumption by the cooling system 54 and/or by the vacuum system 54 so as to reach a magnitude that is above what is needed for normal operation. Such a stored cooling quantity or the additionally achieved vacuum level below a target vacuum, for example, $10^{-3}$ mbar, both of which are available due to the fact that there are operating aggregates 54 that are not being operated and are thus saving on energy consumption, can be saved and can thus be utilized at a later point in time in case of an elevated or prolonged demand.

Figure 2:
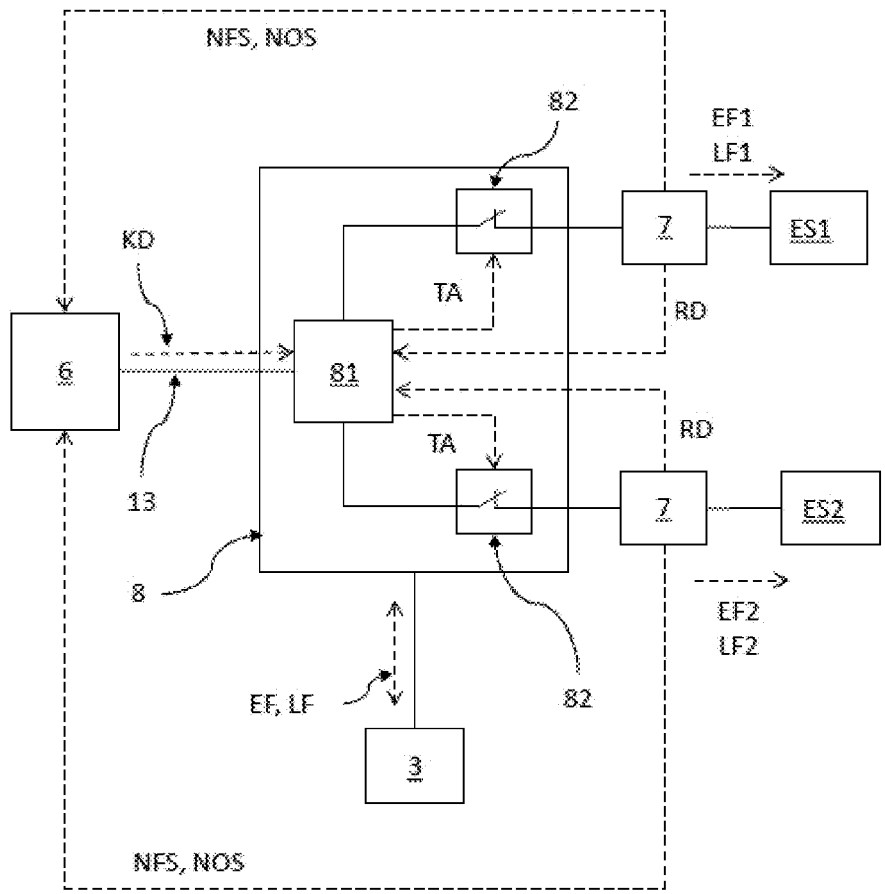
FIG. 2 an embodiment of the first regulation system with a control box.

In order to control the energy storage module 1, the module control unit 6 and the individual components of the energy storage module 1 are connected to each other via data lines (shown by broken lines in FIG. 1), for example, a data bus (CANbus or PROFIBUS). Via the data line 13 (see FIGS. 2 and 3) leading to the regulation systems 31, 32, the module control unit 6 transmits the configuration data KD to the regulator function of the control box 8. FIG. 2 shows an embodiment of the control box 8. In order for the energy and power flow EF, LF between the connected power networks ES1, ES2 and the energy storage module 1 to be divided up in accordance with the regulation and system tasks SA, the energy storage module 1 in this embodiment comprises a control box 8 with a controlling element 81 and separate disconnecting switches 82 for each one of the connected power networks ES1, ES2. The module control unit 6 is connected to the controlling element 81 of the control box 8 via a data connection 10 and it transmits appropriate configuration data of the regulator function KD to the control box 8, here directly to the controlling element 81, for purposes of controlling the energy and power flows. On the basis of the configuration data of the regulator function KD, the controlling element 81 controls the distribution of the energy and power flows EF1, LF1—coming from the DC link 3—to the connected power networks ES1, ES2 as an energy and power flow EF1, LF1 for the power network ES1 and as an energy and power flow EF2, LF2 for the non-local power network ES2. In this embodiment, all that is shown by way of an example is the distribution of the energy flow EF when energy is being fed into both connected power networks ES1, ES2. The control box 8 is likewise configured to control an energy flow from one of the connected power networks (irrespective of whether these are AC or DC networks) ES1, ES2 and an energy flow into the other connected power network ES1, ES2, whereby, depending on the magnitude of the two energy flows, either the negative energy surplus is stored by the energy storage module 1 or else the positive energy surplus is provided by the energy storage module 1. The energy storage module 1 is not shown explicitly here, but rather, only indicated symbolically by means of the appertaining components. The control box 8 simultaneously receives the relevant data RD from the two connected power networks ES1, ES2 via the appertaining measuring units 7, on the basis of which the controlling element 81 deduces the presence of the two connected power networks ES1, ES2 by means of the criteria or threshold values stored in the controlling element 81 for the relevant data RD. In this context, on the basis of an emergency operation signal NFS, the first regulation system 31 is configured to disconnect the DC link from the external power network ES1, ES2. If one or both of the connected power networks ES1, ES2 are no longer available due to a network failure, then this failure of the appertaining power network ES1, ES2 will also be manifested in the corresponding relevant data RD which, in this embodiment, has also been transmitted to the controlling element 81, and in response to this, in this embodiment, the controlling element 81 itself, even without the transmission of appertaining configuration data based on an emergency operation signal NFS, automatically sends appropriate disconnection instructions TA (broken-line arrow) from the module control unit 6 to the appertaining disconnecting switch(es) 82 to disconnect the energy storage module 1 from the connected power network(s) ES1, ES2, after which the disconnecting switch(es) 82 disconnect(s) the previously connected power networks ES1, ES2 from the energy storage module 1. In this process, the connected power network is disconnected within just a few milliseconds. If only one power network is disconnected, then the energy storage module 1 remains functional for the other power networks that are still connected. In this manner, if one power network fails, it is possible to effectively prevent a short circuit or an overload situation in the energy storage module 1. The embodiment shown here, involving one connected local power network ES1 and one connected non-local power network ES2, is merely an example of two connected power networks. In other embodiments, the control box 8 can also be connected to more than two power networks. The two or more connected power networks can also be local power networks of which at least one of the local power networks is connected to the non-local power network in order to carry out non-location bound regulation and system tasks SA (control instructions). The control box 8 shown here is arranged, for example, in the first regulation system 31.

Figure 3:
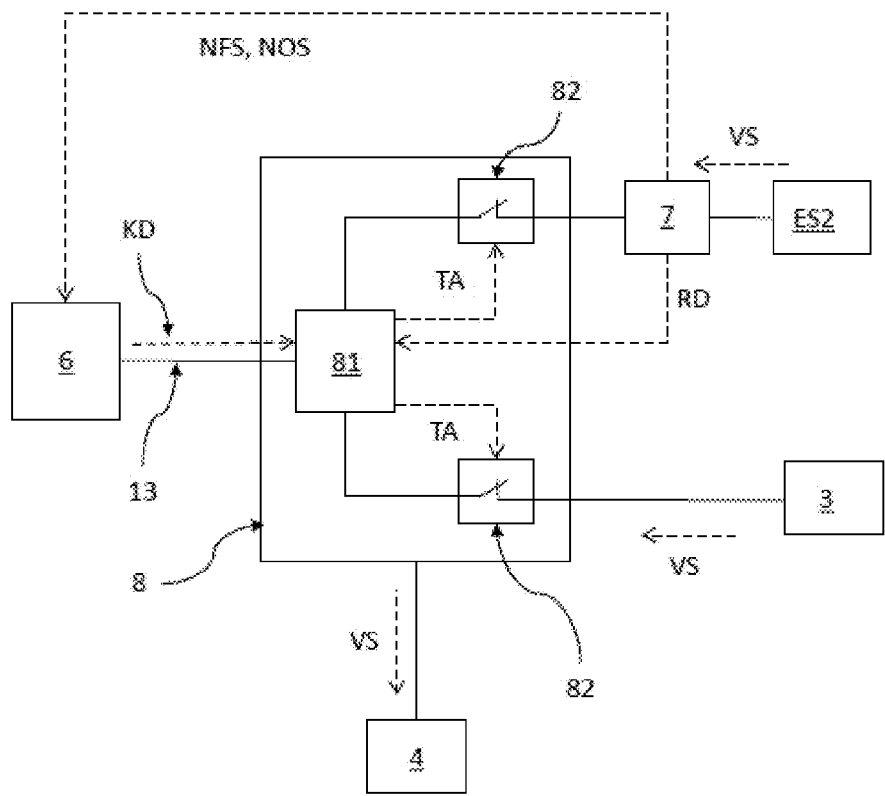
FIG. 3 an embodiment of the second regulation system with a control box.

FIG. 3 depicts another embodiment which shows the control box 8 that is arranged in the second regulation system 32 and that has an external power network ES2 which is additionally connected to the input side 32E in order to supply the supply network 4 during normal operation NO. Here, one of the disconnecting switches 82 is connected to an external power network ES2, while the other disconnecting switch 82 is connected the DC link 3. Here, the controlling element 81 controls the disconnecting switches 82 in such a way that, after the disconnecting switch 82 has been disconnected from the external power network ES2 during emergency operation NF, the disconnecting switch 82 that was previously opened to the DC link 3 is closed so that the internal supply network 4 is connected to the DC link 3 in order to supply the internal supply network 4 with supply network voltage VS (the broken-line arrows indicate the direction of the power flow). The energy storage module 1 is not shown explicitly here, but rather, only indicated symbolically by means of the appertaining components. The control box 8 simultaneously receives the relevant data RD from the connected power network ES2 via the measuring unit 7, on the basis of which the controlling element 81 deduces the presence of the connected power network ES2 by means of the criteria or threshold values stored in the controlling element 81 for the relevant data RD. If the connected power network ES2 is no longer available due to a network failure, then this failure of the power network ES2 will also be manifested in the corresponding relevant data RD which has been transmitted to the controlling element 81, and in response to this, in one embodiment, the controlling element 81 itself, even without appertaining configuration data KD, automatically sends appropriate disconnection instructions TA (broken-line arrow) from the module control unit 6 to the appertaining disconnecting switches 82 to disconnect the internal supply network voltage 4 from the power network ES2, after which the disconnecting switch 82 disconnects the previously connected power network ES2 from the supply network. In this process, the connected power network is disconnected within just a few milliseconds. Owing to the fact that, in response to this, the internal supply network 4 is subsequently connected to the DC link 3 in order to supply the supply voltage VS, the operating aggregates can continue to be operated. In this manner, if one power network ES2 fails, it is possible to effectively prevent a short circuit or an overload situation in the energy storage module 1, thereby ensuring continued operational capability.

Figure 4:
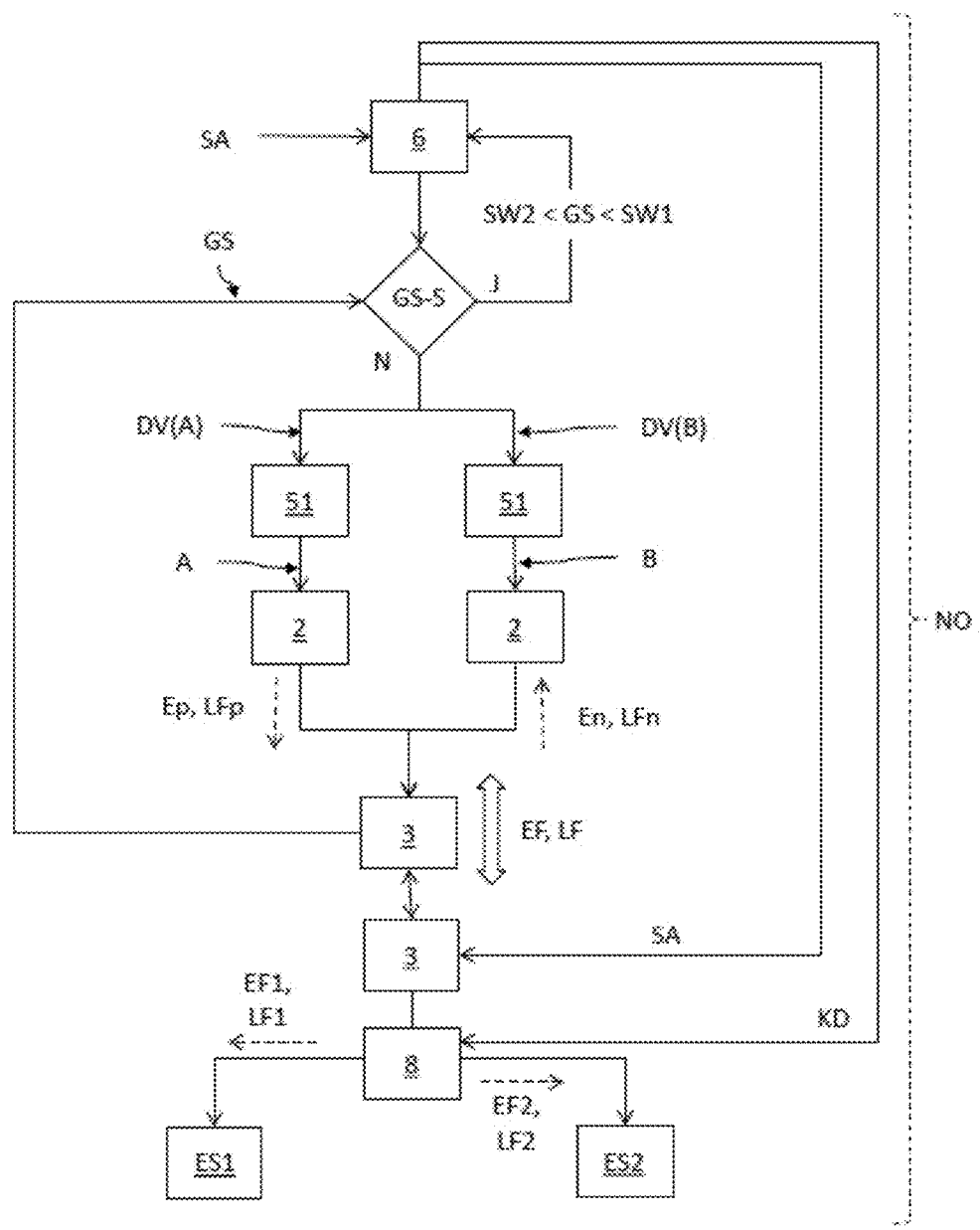
FIG. 4 an embodiment of the method according to the invention for the operation of the energy storage module during normal operation.

FIG. 4 shows an embodiment of the method according to the invention for the operation of an energy storage module 1 during normal operation NO. The module control unit 6 receives external control instructions SA (regulation and system tasks SA) and checks whether the direct voltage GS of the DC link 3 matches the direct voltage target value GS-S. If this is so (GS-S="J" [yes] matches SW2<GS<SW1) and if there are no regulation and system tasks SA to the contrary for feeding energy into or absorbing energy from the connected power networks ES1, ES2, then, by means of appropriate torque specifications DV to the flywheel storage units, the module control unit 6 keeps the direct voltage in the DC link within the target range. If the direct voltage GS exceeds the direct voltage target value (GS-S="N" [no]), then a torque specification DV for accelerating B the flywheel storage units 2 at an energy flow Ep from the power network ES1, ES2 into the DC link 3 is transmitted (by the motor control means 51 or by the module control unit 6). If the direct voltage GS falls below the direct voltage target value (GS-S="N" [no]), then a torque specification DV for decelerating A the flywheel storage units 2 at an energy flow En from the DC link 3 to the power network ES1, ES2 is transmitted (by the motor control means 51 or by the module control unit 6). On the basis of the configuration data for the regulation function KD— which the control box 8 receives from the module control unit 6—the control box 8 regulates the energy and power flows EF, LF—which the control box 8 receives from the regulation system 31—so as to turn them into the energy and power flows EF1, LF1 and EF2, LF2 for the appertaining power networks ES1, ES2 in accordance with their proportions according to the regulation and system tasks SA for the connected external power networks ES1, ES2.

Figure 5:
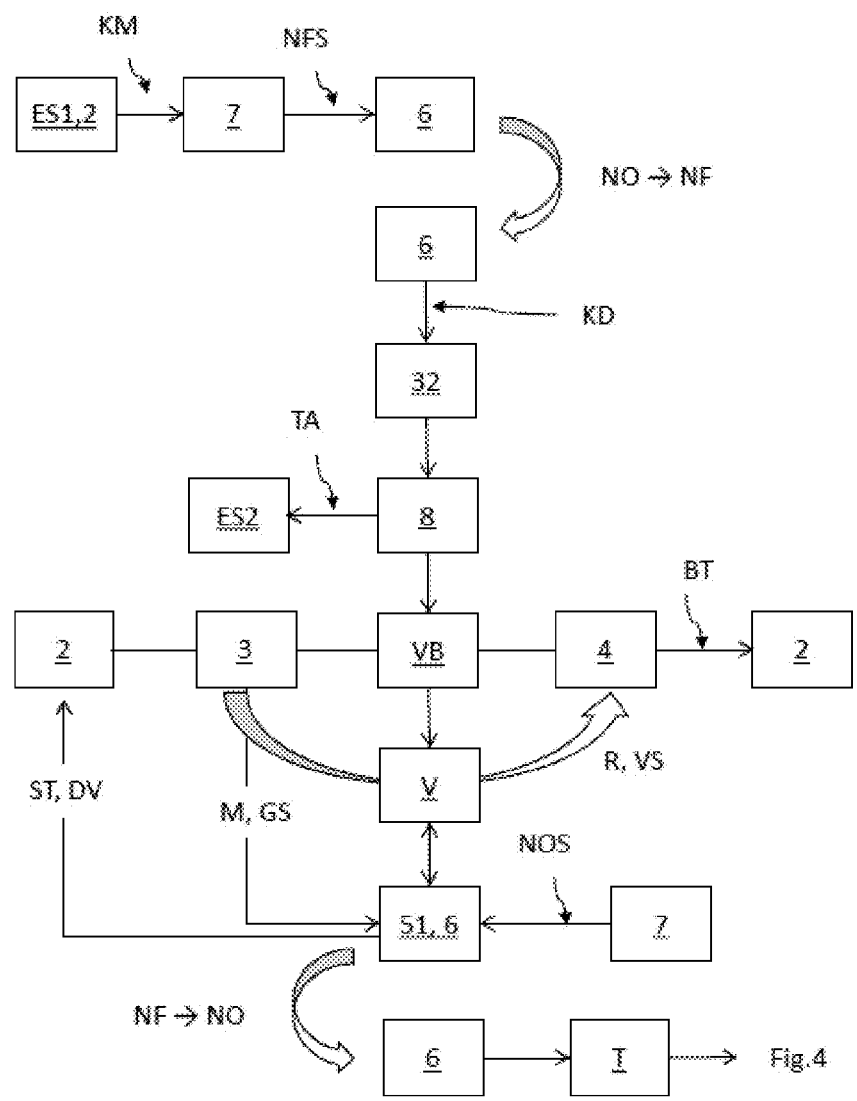
FIG. 5 another embodiment of the method according to the invention for the operation of the energy storage module during emergency operation.

FIG. 5 shows another embodiment of the method according to the invention for the operation of the energy storage module 1 during emergency operation NF which is initially still in normal operation NO. This energy storage module comprises a second regulation system 32 that is directly connected to an external power network ES2 to supply the supply network 4. The control box 8 here corresponds to the control box from FIG. 3. During normal operation NO, the voltage quality of the external power networks ES1, ES2 that are connected to the energy storage module 1 is continuously measured KM by one or more measuring units 7 of the energy storage module 1. In this process, the measuring unit 7 sends an emergency operation signal NFS within the energy storage module 1 if there is an overvoltage or undervoltage in at least the external power network ES2 that is connected to the internal supply network 4. Subsequently, the module control unit 6 switches over from normal operation NO to emergency operation NF (indicated by the arrow), and it causes the second regulation system 32 to disconnect the external power network ES2 at least from the internal supply network 4 in that appropriate configuration data KD is transmitted to the control box 8 of the second regulation system 32, in response to which the control box 8 disconnects the external power network ES2 from the energy storage module 1 by means of the disconnection signal TA. Then, the DC link 3 is connected VB to the internal supply network 4 via the second regulation system 32 and the internal supply network 4 is supplied V with the requisite supply network voltage VS from the DC link 3 in order to ensure the continued operation BT of the flywheel storage units 2. If the energy storage module has a sufficiently large storage capacity, this supply can be maintained over a long first time interval T without functional restrictions. In this context, the supply network voltage VS of the internal supply network 4 is regulated R to a constant value in that, depending on the demand, power is supplied from the DC link 3, for which purpose the voltage of the DC link 3 is measured M either by the motor control means 51 or by means of at least one measuring unit 33, and the flywheel storage units 2 are controlled ST by the motor control means 51 (alternatively also by the module control unit 6) on the basis of the measured voltage GS as a function of the time-related torque specifications DV in such a way that, through the release Ep of energy from one or more flywheel storage units 2 into the DC link 3, its voltage GS does not fall below the lower threshold value SW2, at least as long as the amount of energy stored in the flywheel storage units 2 does not fall below a minimum energy level. Once the external power networks ES1, ES2 (at least the external power network ES2) are once again available to supply the internal supply network 4, the measuring unit 7 emits a normal operation signal NOS and the module control unit 6 changes over from emergency operation NF back to normal operation NO, whereby the internal supply network 4 is once again connected to the external power network(s) ES2 and the electric connection between the DC link 3 and the internal supply network 4 is once again disconnected T by the second regulation system 32 as an automatic response to the normal operation signal NOS. Then the normal operation NO is once again continued, as shown in FIG. 4. If the amount of energy stored in the energy storage module 1 falls below a minimum value, in another embodiment, the energy storage module 1 is ramped down and the internal supply network 4 is disconnected from the DC link 3 by means of the second regulation system 32.

The embodiments shown here constitute merely examples of the present invention and should not be construed in a restrictive manner. Alternative embodiments taken into consideration by the person skilled in the art are likewise encompassed by the protective scope of the present invention.

LIST OF REFERENCE NUMERALS

1 energy storage according to the invention
13 data line, data bus
2 flywheel storage unit
3 DC link
31 first regulation system
32 second regulation system
32A output side of the second regulation system
32E input side of the second regulation system
33 measuring device to measure the voltage in the DC link
4 internal supply network
51 operating aggregate: motor control means
51d direct data connection between the motor control means for NF
52 operating aggregate: component for rotational speed limit
53 operating aggregate: electromagnetic transformer
54 operating aggregate: vacuum system, cooling system, magnet bearing system, other supply systems
6 module control unit
61 storage unit to store external data
62 priority management for carrying out control instructions
7 measuring unit
8 control box
81 controlling element
82 disconnecting switch
9 power sink
10 connection of the external power network to the input side of the second regulation system
A deceleration of the flywheel storage units
B acceleration of the flywheel storage units
DV torque specifications
EF energy flow
EF1, EF2 energy flow into the external power network ES1, ES2
En, LFn energy flow/power flow into the energy storage module or into the flywheel storage units (negative energy flow/power flow)
Ep, LFn energy flow/power flow from the energy storage module or from the flywheel storage units (positive energy flow/power flow)
EK storage capacity per unit of the flywheel storage units
EL storage output per unit of the flywheel storage units
En absorption of energy from the power network
Ep release of energy into the power network
ES1 external power network connected to the first regulation system
ES2 external power network connected to the second regulation system
GS direct voltage in the DC link
GS-S target value of the direct voltage in the DC link
KM continuous measurement of the voltage quality in ES1, ES2
LF power flow LF1, LF2 power flow into the external power network ES1, ES2
M measurement of the voltage in the DC link
NO normal operation
NOS normal operation signal
NF emergency operation
NFS emergency operation signal
KD configuration data
R regulation of the supply network voltage
RD relevant data
SA external control instructions (regulation and system tasks)
ST control of the flywheel storage units
SW1 upper threshold value for the direct voltage
SW2 lower threshold value for the direct voltage
TA disconnection instructions, disconnection from the external power network
V supply of the supply network with voltage
VB connection of the internal supply network to the DC link
VS supply network voltage

The invention claimed is:

1. An energy storage module for the reversible storage of electric energy, comprising several flywheel energy storage units that are electrically connected in parallel via a shared DC link, comprising a first regulation system that is connected to the DC link and that, during normal operation (NO), connects the DC link to one or more external power networks (ES1, ES2) in order to absorb (En) energy from or release (Ep) energy into the external power network(s) (ES1, ES2), and comprising a second regulation system having an input side and an output side, whereby the input side is connected to at least the DC link while the output side is connected to an internal supply network for purposes of supplying one or more electrically powered operating aggregates that are needed to operate the flywheel energy storage units, whereby the second regulation system is configured to connect the DC link to the internal supply network, at least during emergency operation (NF) when the external power network is absent, and to supply the supply network with the requisite supply power (VL) only from the DC link in order to ensure the continued operation of the flywheel energy storage units, at least during a first time interval (T).

2. The energy storage module according to claim 1, characterized in that, during emergency operation (NF), the second regulation system regulates the supply network voltage (VS) in the internal supply network in an essentially constant manner in that, depending on the demand, it supplies power from the DC link.

3. The energy storage module according to claim 2, characterized in that the input side of the second regulation system is additionally connected to an external power network (ES2) and the second regulation system is configured to provide the supply power for the internal supply network from the external power network during normal operation (NO), and from the DC link during emergency operation.

4. The energy storage module according to claim 3, characterized in that the energy storage module is configured to continuously monitor the direct voltage in the DC link, and the flywheel energy storage units each have motor control means which, independently of a module control unit for controlling the flywheel energy storage units during normal operation, are configured so that, in the case of emergency operation (NF)—at least on the basis of the monitored direct voltage (GS)—they do not allow the direct voltage (GS) in the DC link to fall below a lower threshold value (SW2) in that they release (EFp) energy from the appertaining flywheel energy storage units, at least as long as the amount of energy stored in the appertaining flywheel energy storage units has not fallen below a minimum energy level.

5. The energy storage module according to claim 4, characterized in that there is at least one measuring device in the DC link for purposes of measuring the direct voltage (GS) in the DC link, and said device is connected at least to the appertaining motor control means of the flywheel storage units.

6. The energy storage module according to claim 5, characterized in that the motor control means of the individual flywheel storage units are connected directly to each other, independently of the module control unit, and they each comprise a flywheel control means which is configured to carry out a jointly coordinated support operation (SB) of the direct voltage (GS) in the DC link by all of the flywheel storage units during emergency operation (NF).

7. The energy storage module according to claim 6, characterized in that the energy storage module comprises one or more measuring units to continuously measure the voltage quality of the external power networks connected to the energy storage module, whereby the measuring unit or units are configured to emit an emergency operation signal (NFS) within the energy storage module in case of an overvoltage or an undervoltage in at least one of the connected external power networks, and the second regulation system is configured to switch over from normal operation (NO) to emergency operation (NF) as an automatic response to the emergency operation signal (NFS).

8. The energy storage module according to claim 7, characterized in that the first regulation system is configured to disconnect the DC link from the external power network in response to the emergency operation signal (NFS), and/or the second regulation system is configured to disconnect the internal supply network from the external power network in response to the emergency operation signal (NFS).

9. The energy storage module according claim 8, characterized in that the measuring units are configured to send a normal operation signal (NOS) within the energy storage module once the external power network is available again, and the energy storage module is configured to change over from emergency operation (NF) to normal operation (NO) as an automatic response to the normal operation signal (NOS) and to connect the DC link and the internal supply network to the external power network(s).

10. A method for controlling an energy storage module according to claim 1, comprising the following steps:
  energy from a shared DC link to which several flywheel storage units are electrically connected in parallel is released (Ep) into or absorbed (En) from one or more external power networks that are connected to the DC link via a first regulation system, and
  the one or more operating aggregates needed to operate (BT) the flywheel storage units are supplied with the energy required to operate (BT) the operating aggregates during the normal operation (NO) of the energy storage module via an internal supply network, whereby the supply network is connected to an output side of a second regulation system whose input side is connected at least to the DC link, and
  the energy storage module is switched over from normal operation (NO) to emergency operation (NF) when the external power network is absent, and
  the internal supply network is supplied (V) with the supply power (VL) for the continued operation (BT) of the flywheel storage units when the external power network is absent, and this is done only from the DC link, at least during a first time interval (T).

11. The method according to claim 10, comprising the following additional step:
the supply network voltage (VS) of the internal supply network is regulated (R) to a constant value in that, depending on the demand, power is supplied from the DC link by means of the second regulation system.

12. The method according to claim 11, comprising the following additional steps:
the direct voltage (GS) of the DC link is continuously monitored, preferably by means of at least one measuring device arranged in the DC link, and
independently of a module control unit for controlling the flywheel storage units during normal operation (NO), in case of emergency operation (NF), the flywheel storage units are controlled (ST) by means of appertaining motor control means in the individual flywheel storage units on the basis of the monitored direct voltage (GS), so that, due to the release (EFp) of energy from the appertaining flywheel storage units into the DC link, its direct voltage (GS) does not fall below a lower threshold value (SW2), at least as long as the amount of energy stored in the flywheel storage units does not fall below a minimum energy level, preferably by stipulating time-related torque specifications (DV) for the appertaining flywheel storage units.

13. The method according to claim 12, comprising the following additional steps:
a jointly coordinated support operation (SB) of all flywheel storage units is carried out by means of the motor control means in order to regulate the direct voltage (GS) in the DC link to a constant value during emergency operation (NF) in that each motor control means encompasses flywheel control means, and the individual motor control means of the flywheel storage units are connected to each other, independently of the module control unit, and
individual flywheel storage units are systematically excluded from the shared support operation (SB) in order to provide a minimum amount of energy for a controlled ramp-down of the flywheel storage units.

14. The method according to claim 13, comprising the following additional step:
the internal supply network is disconnected from the DC link by means of the second regulation system once the amount of energy stored in the flywheel storage units has fallen below a minimum energy level.

15. The method according to claim 10, comprising the following additional steps:
the voltage quality in the external power networks that are connected to the energy storage module is continuously measured (KM) employing one or more measuring units of the energy storage module,
an emergency operation signal (NFS) is emitted within the energy storage module by one measuring unit in case of an overvoltage or an undervoltage in at least one of the connected external power networks,
the external power network(s) is/are disconnected at least from the DC link by means of the first regulation system,
the flywheel storage units are switched over from normal (NO) operation to emergency operation (NF) and the internal supply network is supplied with the requisite supply power (VL) from the DC link by means of the second regulation system as an automatic response to a drop in the direct voltage (GS) in the DC link or as an automatic response to the emergency operation signal (NFS),
a normal operation signal (NOS) is emitted by the measuring units once the external power network becomes available once again,
the energy storage module is switched over from emergency operation (NF) to normal operation (NO), and
the internal supply network is connected to the external power network(s), preferably by means of the second regulation system, as an automatic response to the normal operation signal (NOS).

* * * * *